US009367999B2

(12) United States Patent
Stewart

(10) Patent No.: US 9,367,999 B2
(45) **Date of Patent: *Jun. 14, 2016**

(54) GAMING SYSTEM AND METHOD OF GAMING HAVING PLAYER-SELECTABLE WIN LINES

(75) Inventor: Scott Monroe Stewart, Las Vegas, NV (US)

(73) Assignee: Aristocrat Technologies Australia Pty Limited (AU)

( * ) Notice: Subject to any disclaimer, the term of this patent is extended or adjusted under 35 U.S.C. 154(b) by 0 days.

This patent is subject to a terminal disclaimer.

(21) Appl. No.: 13/523,274

(22) Filed: Jun. 14, 2012

(65) Prior Publication Data

US 2012/0252554 A1 Oct. 4, 2012

Related U.S. Application Data

(63) Continuation of application No. 12/476,537, filed on Jun. 2, 2009, now Pat. No. 8,221,217.

(60) Provisional application No. 61/058,419, filed on Jun. 3, 2008.

(51) Int. Cl.
*G06F 17/00* (2006.01)
*G07F 17/34* (2006.01)
*G07F 17/32* (2006.01)

(52) U.S. Cl.
CPC ............ *G07F 17/34* (2013.01); *G07F 17/3232* (2013.01)

(58) Field of Classification Search
CPC . G07F 17/32; G07F 17/3202; G07F 17/3211; G07F 17/3213; G07F 17/3244; G07F 17/3265; G07F 17/3269; G07F 17/34; G07F 17/326; G07F 17/3262; G07F 17/3267; G07F 17/3293
USPC ................ 463/16–21; 273/138.1, 139, 143 R
See application file for complete search history.

(56) References Cited

U.S. PATENT DOCUMENTS 3,806,121 A 4/1974 Crossley
4,448,419 A * 5/1984 Telnaes ........................... 463/21
4,704,816 A 11/1987 Kuchar
4,858,932 A * 8/1989 Keane ............................. 463/21
(Continued)

FOREIGN PATENT DOCUMENTS

CA 255995 12/2006
CA 2566786 5/2007
(Continued)

*Primary Examiner* — Milap Shah
(74) *Attorney, Agent, or Firm* — McAndrews, Held & Malloy, Ltd.

(57) ABSTRACT

A gaming system comprising a display area and a player symbol selector for selecting the player symbols from a plurality of player symbols. The player symbol selector comprises a plurality of reels and each reel has a plurality of player symbols. The player symbol selector is arranged so that selected player symbols are displayed at an array of display positions when the reels are stationary. A display position selector enables a player to select, prior to stopping of the reels, groups of display positions. An award allocator allocates an award associated with a winning combination of the player symbols when a winning combination of the player symbols is displayed along a win line. The player symbol selector is arranged so that each one of different player symbols of each reel has the same probability to be displayed at any one of the display positions associated with that reel.

26 Claims, 7 Drawing Sheets

(56) References Cited

U.S. PATENT DOCUMENTS

| | | | | | |
|---|---|---|---|---|---|
| 5,085,436 | A * | 2/1992 | Bennett | 463/21 |
| 5,102,137 | A | 4/1992 | Ekiert | |
| 5,154,421 | A | 10/1992 | Hamano | |
| 5,324,036 | A | 6/1994 | Morrow | |
| 5,873,781 | A * | 2/1999 | Keane | 463/22 |
| 5,879,234 | A * | 3/1999 | Mengual | 463/20 |
| 5,937,564 | A | 8/1999 | Perreault | |
| 5,988,638 | A * | 11/1999 | Rodesch et al. | 273/143 R |
| 6,015,352 | A | 1/2000 | Leopold et al. | |
| 6,093,102 | A * | 7/2000 | Bennett | 463/20 |
| 6,203,429 | B1 * | 3/2001 | Demar et al. | 463/20 |
| 6,676,510 | B1 * | 1/2004 | Bittman et al. | 463/20 |
| 8,221,217 | B2 * | 7/2012 | Stewart | 463/20 |
| 2006/0016117 | A1 | 1/2006 | Aanenson | |
| 2007/0021187 | A1 | 1/2007 | Gauselmann | |
| 2007/0173315 | A1 | 7/2007 | Law | |
| 2007/0265059 | A1 | 11/2007 | Ando et al. | |
| 2008/0070668 | A1 | 3/2008 | Castellari | |

FOREIGN PATENT DOCUMENTS

| | | |
|---|---|---|
| CA | 2549580 | 12/2007 |
| CA | 2592913 | 12/2007 |
| GB | 190801514 | 5/1909 |
| GB | 125721 | 4/1919 |
| GB | 162129 | 4/1921 |
| GB | 566234 | 12/1944 |
| GB | 591393 | 8/1947 |
| GB | 931678 | 7/1963 |
| GB | 1403202 | 8/1975 |
| GB | 1405897 | 9/1975 |
| GB | 1531139 | 11/1978 |
| GB | 2092795 | 8/1982 |
| JP | 11239673 | 9/1999 |
| JP | 2000167104 | 6/2000 |
| JP | 2001025540 | 1/2001 |
| JP | 2004121457 | 4/2004 |
| JP | 2004160158 | 6/2004 |
| JP | 2004275469 | 10/2004 |
| JP | 2004283497 | 10/2004 |
| JP | 2004321337 | 11/2004 |
| JP | 2005095674 | 4/2005 |
| JP | 2006061532 | 3/2006 |
| JP | 2006095188 | 4/2006 |
| JP | 2006102287 | 4/2006 |
| JP | 2006141750 | 6/2006 |
| JP | 2006289008 | 10/2006 |
| JP | 2006304940 | 11/2006 |
| JP | 2006305298 | 11/2006 |
| JP | 2006340807 | 12/2006 |
| JP | 2007029577 | 2/2007 |
| JP | 2007029631 | 2/2007 |
| JP | 2007037579 | 2/2007 |
| JP | 2007037580 | 2/2007 |
| JP | 2007054425 | 3/2007 |
| JP | 2007089679 | 4/2007 |
| JP | 2007105239 | 4/2007 |
| JP | 2007151816 | 6/2007 |
| JP | 2007190134 | 8/2007 |
| JP | 2007252486 | 10/2007 |
| JP | 2007252487 | 10/2007 |
| JP | 2007312883 | 12/2007 |
| JP | 2007313283 | 12/2007 |
| JP | 2007313284 | 12/2007 |
| JP | 2007330761 | 12/2007 |
| NZ | 532273 | 1/2006 |
| WO | 2007005846 | 1/2007 |

* cited by examiner

GAMING SYSTEM AND METHOD OF GAMING HAVING PLAYER-SELECTABLE WIN LINES

RELATED APPLICATIONS

This application is a continuation of U.S. patent application Ser. No. 12/476,537 having a filing date of Jun. 2, 2009, now U.S. Pat. No. 8,221,217, which claims priority to U.S. Provisional Patent Application No. 61/058,419 having a filing date of Jun. 3, 2008, which is incorporated herein by reference in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The present invention broadly relates to a gaming system and method of gaming.

Player operated gaming systems, such as coin-operated slot machines, are widely used in many countries. Such gaming systems may comprise a plurality of rotatable reels having player symbols at their edges. After stopping the rotating reels, a combination of player symbols is visible. If the combination of player symbols includes a winning combination of player symbols, the player is awarded a prize.

The gaming system may comprise a display area in which for example 3 player symbols of each reel are visible when the reel is stopped. The gaming system may comprise 5 such reels and consequently the display area comprises 15 display portions at which player symbols are visible when the reels are stopped.

The player typically is given the opportunity to purchase win lines, which usually comprise adjacent display positions within the display area and along which a winning combination of player symbols may be displayed.

Various strategies have been used to make games more enticing to players. However, a minimum return to a player percentage (RTP) is usually required by legislation and it is often a challenge to provide a gaming machine that has new and enticing features and at the same time the RTP is above the required RTP.

BRIEF SUMMARY OF THE INVENTION

The present invention provides in a first aspect a gaming system comprising:

a plurality of rotatable reels comprising stops associated with player symbols, the plurality of reels being arranged so that selected player symbols are displayed in an array of display positions when the reels are stationary;

a player symbol selector for selecting the player symbols from a plurality of player symbols, the player symbol selector comprising a rotation controller arranged to control rotation and stopping of the reels;

a display position selector arranged to enable a player to select, prior to stopping of the reels, groups of display positions, each selected display position determining a respective win line;

an award allocator arranged to allocate an award when a winning combination of the player symbols is displayed along a win line;

wherein the player symbol selector is arranged so that each one of different player symbols of each reel has the same probability to be displayed at any one of the display positions associated with that reel.

Each reel may have a plurality of stops and each stop may have a weighted stopping probability.

In one embodiment each reel has a plurality of stops and each stop is associated with a range of numbers defining the weighted stopping probability, wherein the player symbol selector comprises a random number generator configured to randomly select a number of the ranges of numbers and thereby select player symbol for display. For example, a total number of weights may be N and a range 0-N may be divided into X consecutive ranges of numbers associated with stops of at least one of the reels, wherein X is the number of stops of a reel and wherein the ranges of the numbers are extended so as to account for a number of duplicate player symbols associated with the reel.

The gaming system may be provided in the form of a gaming machine that is arranged to implement the game or may alternatively be provided in the form of a gaming terminal that is arranged to interact with another device, such as a gaming server.

Each win line may comprise a respective sequence of adjacent display positions including one display position of each column and including display positions of one row or of adjacent rows. For example, each win line may comprise a respective sequence of adjacent display positions including one display position of each column and including display positions of a centre row.

Winning combinations may comprise predetermined combinations of the player symbols. For example, the player symbols may comprise special player symbols and the winning combinations may comprise two or more of the special player symbols.

The gaming system may be arranged so that, if one or more groups of display positions are unselected, one display position of the at least one unselected groups forms a part of each win line. In this case the gaming system typically is arranged so that the number of win lines is mn* where m is the number of rows of the array and n* is the number of selected groups of display positions, such as columns of the display positions.

In one specific example the display area comprises 3 rows and 5 columns of display positions. If the player selects successively the first, second, third, fourth and fifth column of the display positions, the number of win lines increases from 3 to 9, 27, 81 and 243, respectively. It is to be appreciated, however, that alternatively the display area may comprise any other number of rows and columns with associated numbers of possible win lines.

The gaming system may be arranged so that the player may select groups of display positions by placing one or more bets. Further, the gaming system may be arranged so that a number of bets is proportional to the number of selected groups of display positions. In one specific example the bets are multiples of an integer, such as multiples of 5. In this example selection of the first, second, third, fourth and fifth group may comprise purchasing of 5, 10, 15, 20 and 25 bets, respectively.

In one specific embodiment of the present invention the award allocator is arranged to control directly the award, such as a payment or number of credit points that are awarded when a winning combination of player symbols is displayed at display positions including at least one display position of a selected column. The award allocator may alternatively be arranged to control the award in any possible other direct or indirect manner.

The award allocator may be arranged so that the awards that are associated with winning combinations are larger for a larger number of selected groups of display positions than for a smaller number of selected groups of display positions. The award allocator may be arranged to determine each award as a function of the quantity of the selected groups of display positions in a manner such that a return to player percentage (RTP) is above a predetermined return to player percentage.

Embodiments of the present invention have significant practical advantages. The gaming system may be arranged to enable the player to select groups of display positions, such as columns, by purchasing bets and the number of bets may increase with the number of selected groups of display positions, such as in multiples of five bets. In this example the award allocator may be arranged to increase the awards associated with winning combinations as the number of selections and associated bets are increased such that the return to player percentage is always at or above the predetermined RTP, regardless how many bets are placed.

The present invention provides in a second aspect a gaming device comprising:

a plurality of electro-mechanical reels each having a periphery displaying gaming symbols and a stop S associated with each of said symbols;

a device for starting and stopping rotation of each reel, said reels when stopped defining a display matrix of n columns and m rows and one or more outcomes;

a processor to control the device to stop each reel at a stop S determined by, for each reel, a set of numbers X defining a total weighting TW, assigning to each stop S a unique subset of numbers of X such that the probability of any symbol appearing in any row m is the same;

a random number generator configured to randomly select a number of X for each reel, said number falling in an assigned subset for a selected stop S, said processor configured to control the device to rotate and stop said reel at the selected stop and determine at least any winning outcomes.

The gaming device may comprise a wagering apparatus for the player to wager on at least one symbol arrangement of the outcome, the number of possible symbol arrangements being mn.

In one embodiment the wagering apparatus provides for the player to wager on predetermined symbol arrangements. The predetermined symbol arrangements may include one reel defining a column n and the centre row of remaining columns.

In one embodiment the processor is configured to determine winning symbol combinations in any wagered arrangement and to issue an award therefore.

The processor may also be configured to issue an award to the player for any winning arrangement based upon the amount wagered on arrangement with the winning combination, the award for each wager amount having substantially the same RTP.

The present invention provides in a third aspect a method of gaming comprising:

selecting player symbols from a plurality of player symbols;

rotating a plurality of reels, each reel being associated with player symbols, the plurality of reels being arranged so that selected player symbols are displayed at an array of display positions when the reels are stationary;

stopping the reels;

enabling a player to select, prior to stopping of the reels, groups of display positions, each selected display position determining a respective win line; and allocating an award when a winning combination of the player symbols is displayed along a win line;

wherein the player symbols are selected so that each one of different player symbols of each reel has the same probability to be displayed at any one of the display positions associated with the reel.

Each reel may have a plurality of stops and each stop may be associated with a weighted stopping probability.

In one embodiment each reel comprises a plurality of stops and each stop of each reel is associated with a range of numbers defining a weighted stopping probability for selecting that stop, wherein the step of selecting player symbols comprises selecting random numbers of the ranges of numbers and thereby selecting player symbol for display. For example, a total number of weights may be N and a range 0-N may be divided into X consecutive ranges of numbers with which stops of each reel are associated, wherein X is the number of stops of each reel and wherein the ranges of the numbers are extended so as to account for a number of duplicate player symbols that each reel comprises.

The method may be conducted so that, if one or more groups of display positions are unselected, one display position of the at least one unselected group of display positions forms a part of each win line. In this case the method may be conducted so that the number of wine lines is mn* where m is the number of rows of the array, n* is the number of selected groups of display positions, such as columns of display positions.

In one specific embodiment the award is determined so that the award that is associated with each winning combination is larger for a larger number of selected groups of display positions than for a smaller number of selected groups of display positions. The award associated with each winning combination may be determined so that, as a function of the quantity of the selected groups of display positions, the return to player percentage is above a predetermined return to player percentage.

The present invention provides in a fourth aspect a computer program for instructing a computer and arranged so that, when loaded in the computer, a system comprising the computer operates as a gaming system in accordance with the first or second aspect of the present invention.

The present invention provides in a fifth aspect a computer readable medium having a computer readable program code embodied therein for causing a system comprising a computer medium to operate as a gaming system in accordance with the first or second aspect of the present invention.

The present invention provides in a sixth aspect a system comprising a computer that is arranged for operation in accordance with the gaming system as defined by the first aspect or second of the present invention.

The invention will be more fully understood from the following description of specific embodiments of the invention. The description is provided with reference to the accompanying drawings.

DETAILED DESCRIPTION OF THE INVENTION

Specific embodiments of the present invention concern a gaming system which comprises a display area for displaying player symbols. In general the display area is arranged to display m rows and n columns of player symbols. The gaming system further comprises a player symbol selector comprising a plurality of reels that are rotatable about an axis. The player symbols are positioned at edges of the reels. Further, the gaming system comprises a rotation controller arranged to control rotation and stopping of the reels. When the reels are stopped, selected player symbols are displayed in the display area. The player symbol selector is arranged so that each player symbol of each reel has the same probability to be displayed at any one of the display positions associated with the reel.

A display position selector is arranged to enable a player to select, prior to stopping of the reels, groups of display positions such as columns of display positions associated with a respective reels by purchasing bets. Each selected display position determines a respective win line. An award allocator, which comprises an award controller, is arranged to determine an award associated with a winning combination of the player symbols. This award is dependent on the quantity of the selected groups of display positions.

In one specific embodiment, the award allocator is arranged so that a return to player (RTP) percentage equal to or above a predetermined RTP percentage regardless of the number of selected columns. The award allocator is arranged to allocate the award when a winning combination of the player symbols is displayed along a win line.

The winning combinations may comprise predetermined combinations of player symbols. For example, the player symbols may comprise special player symbols and the winning combinations may comprise two or more of the special player symbols. Further, the winning combination may be one of a plurality of winning combinations.

In one example the gaming system is arranged so that, if one or more columns are unselected, one display position of the at least one unselected column forms a part of each win line. In this case the gaming system typically is arranged so that the number of the win lines is mn* where n* is the number of selected columns.

Figure 1:
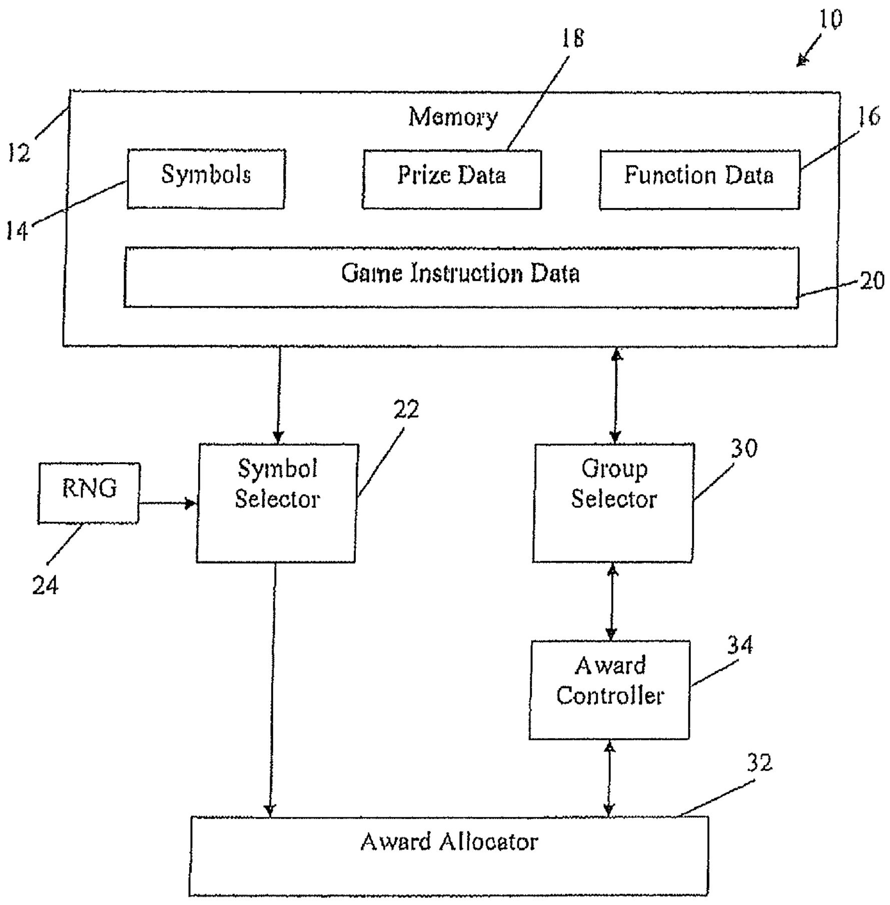
FIG. 1 is a diagrammatic block diagram of a gaming system in accordance with an embodiment of the present invention.

Referring now to FIG. 1, a gaming system according to an embodiment of the present invention is now described. The gaming system 10 comprises a memory 12 arranged to store player symbol data 14 indicative of a plurality of player symbols for selection and display to a player during a game, function data 16 indicative of one or more functions associated with one or more of the player symbols, prize data 18 indicative of prize amounts associated with win outcomes for reaching each level of the game, and game instruction data 20 indicative of game instructions usable by the gaming system 10 to control operation of the game.

The gaming system 10 also includes a player symbol selector 22 which is arranged to select the player symbols for display to a player, in this example using a random number generator 24.

It will be appreciated that the random number generator 24 may be of a type which is arranged to generate pseudo random numbers based on a seed number, and that in this specification the term "random" will be understood accordingly to mean truly random or pseudo random.

The gaming system 10 also includes a group selector 30 that is arranged to select at least one group of display positions, for example a column of display positions associated with a reel.

The group selector 30 is in this example controllable by the player. The group selector 30 is arranged so that the player can choose groups of display positions for selection by placing bets. The group selector 30 is arranged to provide a visual selection at the selected groups of display positions.

The group selector 30 is in this example arranged so that the player has the option to select one or more groups of display positions prior to commencement of the game. Alternatively, the group selector 30 may be arranged so that the player can still select groups of display positions after commencement of a game and before display of the player symbols.

The gaming system 10 also comprises an award allocator 32 which communicates with the group selector 30 and comprises an award controller 34. The award allocator 32 with the award controller 34 determine the award amount dependent upon the number of groups selected. The award allocator 32 allocates the award when a winning combination of player symbols is displayed along a win line.

Prizes may also be allocated on the basis of the occurrence of particular player symbols, for example a row of Dollar Sign symbols or Seven symbols, a consecutive sequence such as 1,2,3, occurrence of odd or even numbers, occurrence of the same symbol combination and so on.

Instead of providing monetary prize amounts, the prize allocated to a player for reaching a level and/or any additional prize may be in the form of points, tokens, progressive prizes, eligibility for feature games, tournament entitlements, or special symbol entitlements in other games, such as an additional wild symbol for a predefined number of games. For example, if the win is not a Jackpot prize, the win, or a portion thereof, may be contributed to a progressive Jackpot.

In the embodiment described below, some of the elements of the symbol selector 22, the group selector 30, the award allocator 34 with the award controller 36 are implemented using a microprocessor and associated programs, although it will be understood that other implementations are envisaged.

The gaming system 10 can take a number of different forms.

In a first form, a stand alone gaming machine is provided wherein all or most components required for implementing the game are present in a player operable gaming machine.

In a second form, a distributed architecture is provided wherein some of the components required for implementing the game are present in a player operable gaming machine and some of the components required for implementing the game are located remotely relative to the gaming machine. For example, a "thick client" architecture may be used wherein part of the game is executed on a player operable gaming machine and part of the game is executed remotely, such as by a gaming server; or a "thin client" architecture may be used wherein most of the game is executed remotely such as by a gaming server and a player operable gaming machine, such as a game terminal, is used only to display audible and/or visible gaming information to the player and receive gaming inputs from the player.

However, it will be understood that other arrangements are envisaged. For example, an architecture may be provided wherein a gaming machine is networked to a gaming server and the respective functions of the gaming machine and the gaming server are selectively modifiable. For example, the gaming system may operate in stand alone gaming machine mode, "thick client" mode or "thin client" mode depending on the game being played, operating conditions, and so on. Other variations will be apparent to persons skilled in the art.

Figure 2:
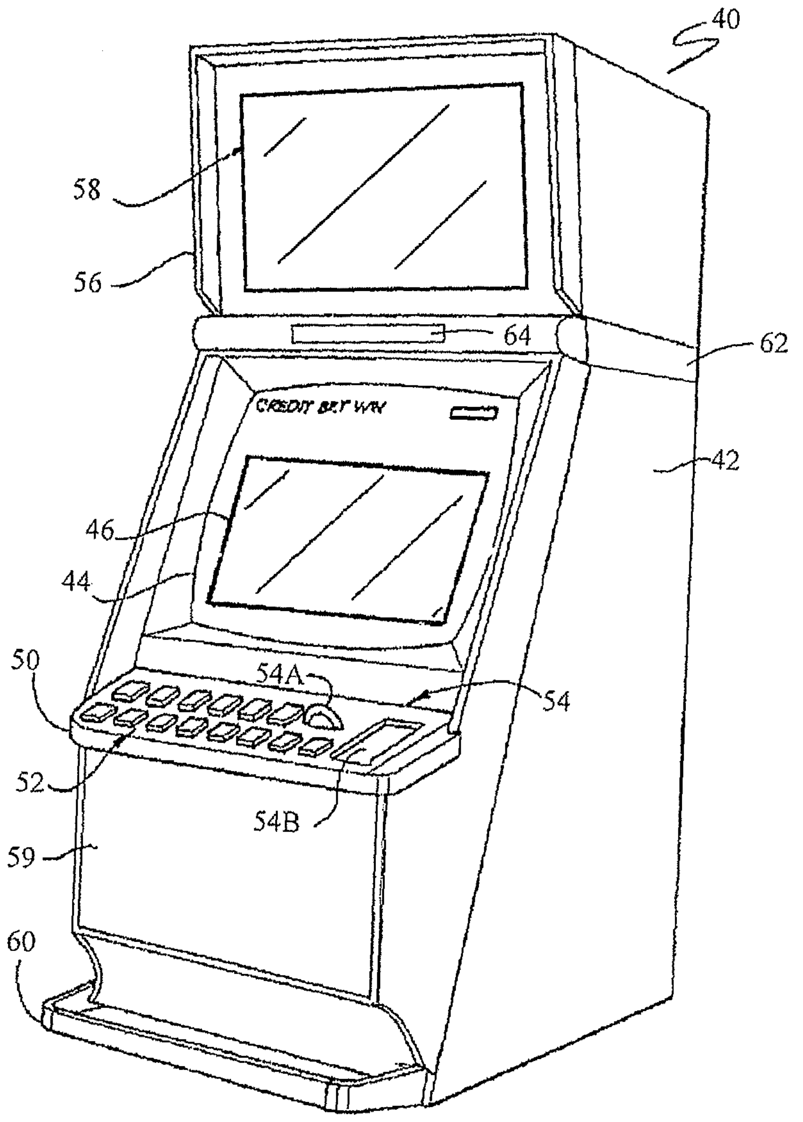
FIG. 2 is a diagrammatic representation of a gaming system in accordance with an embodiment of the present invention with the gaming system implemented in the form of a stand alone gaming machine.

A gaming system in the form of a stand alone gaming machine 40 is illustrated in FIG. 2. The gaming machine 40 includes a console 42 having a display area 44 on which is displayed an array of display positions 46. In this example there are 3 rows and 5 columns of display positions 46. A mid-trim 50 of the gaming machine 40 houses a bank of buttons 52 for enabling a player to interact with the gaming machine during the game, including enabling the player to select the bet amount and the display positions 45. The mid-trim 50 also houses a credit input mechanism 54 which in this example includes a coin input chute 54A and a bill collector 54B. Other credit input mechanisms may also be employed, for example, a card reader for reading a smart card, debit card or credit card. A reading device may also be provided for the purpose of reading a player tracking device, for example as part of a loyalty program. The player tracking device may be in the form of a card, flash drive or any other portable storage medium capable of being read by the reading device.

A player marketing module (PMM) 62 having a display 64 is connected to the gaming machine 40. The main purpose of the PMM 62 is to allow the player to interact with a player loyalty system. The PMM 62 has a magnetic card reader for the purpose of reading a player tracking device, for example as part of a loyalty program. However other reading devices may be employed and the player tracking device may be in the form of a card, flash drive or any other portable storage medium capable of being read by the reading device. In this example, the PMM 62 is a Sentinel III device produced by Aristocrat Technologies Pty Ltd.

A top box 56 may carry artwork 58, including for example pay tables and details of bonus awards and other information or images relating to the game. Further artwork and/or information may be provided on a front panel 59 of the console 42. A coin tray 60 is mounted beneath the front panel 59 for dispensing cash payouts from the gaming machine 40.

The display area 44 is in the form of a stepper motor driven reel display. The display area 44 in this example is arranged to display several reels, each reel of which has several associated symbols. Typically 3, 4 or 5 reels are provided. The display area 44 is arranged to display a portion of the display positions 46 associated with each reel. In this example there are three display positions of each of the 5 reels visible. The player is able to select the column of display positions 46 associated with each of the reels by inputting a selection using the buttons 52. The top box 56 may also include a display, for example a video display unit.

Figure 3:
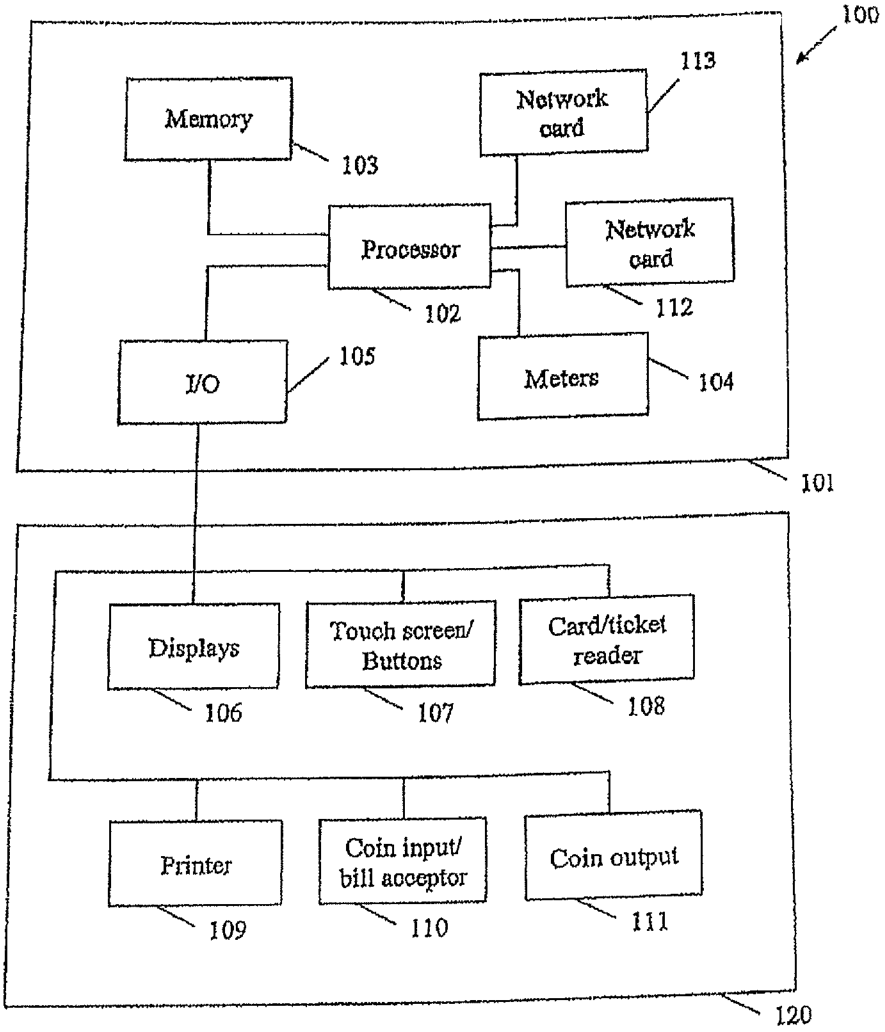
FIG. 3 is a schematic block diagram of operative components of the gaming machine shown in FIG. 2.

FIG. 3 shows a block diagram of operative components of a typical gaming machine 100 which may be the same as or different to the gaming machine shown in FIG. 2.

The gaming machine 100 includes a game controller 101 having a processor 102. Instructions and data to control operation of the processor 102 are stored in a memory 103 which is in data communication with the processor 102.

Typically, the gaming machine 100 will include both volatile and non-volatile memory and more than one of each type of memory, with such memories being collectively represented by the memory 103.

A player marketing module (PMM) 72 having a display 74 is connected to the gaming machine 50. The main purpose of the PMM 72 is to allow the player to interact with a player loyalty system. The PMM 72 has a magnetic card reader for the purpose of reading a player tracking device, for example as part of a loyalty program. However other reading devices may be employed and the player tracking device may be in the form of a card, flash drive or any other portable storage medium capable of being read by the reading device. In this example, the PMM 72 is a Sentinel III device produced by Aristocrat Technologies Pty Ltd.

Figure 4:
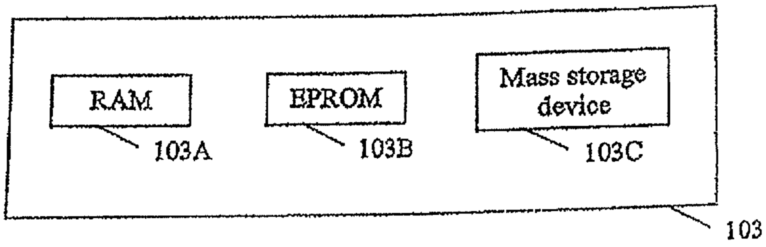
FIG. 4 is a schematic block diagram of components of a memory of the gaming machine shown in FIG. 2.

FIG. 4 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere, and data indicative of symbols, prize amounts and symbol functions used in the game.

The gaming machine has hardware meters 104 for purposes including ensuring regulatory compliance and monitoring player credit, an input/output (I/O) interface 105 for communicating with a player interface 120 of the gaming machine 100, the player interface 120 having several peripheral devices. The input/output interface 105 and/or the peripheral devices may be intelligent devices with their own memory for storing associated instructions and data for use with the input/output interface or the peripheral devices. A random number generator module 113 generates random numbers for use by the processor 102.

In the example shown in FIG. 3, the peripheral devices that communicate with the game controller 101 comprise one or more displays 106, a touch screen and/or bank of buttons 107, a card and/or ticket reader 108, a printer 109, a bill acceptor and/or coin input mechanism 110 and a coin output mechanism 111. Additional hardware may be included as part of the gaming machine 100, or hardware may be omitted as required for the specific implementation.

In addition, the gaming machine 100 may include a communications interface, for example a network card 112. The network card may, for example, send status information, accounting information or other information to a central controller, server or database and receive data or commands from the central controller, server or database.

It is also possible for the operative components of the gaming machine 100 to be distributed, for example input/output devices 106, 107, 108, 109, 110, 111 may be provided remotely from the game controller 101.

Figure 5:
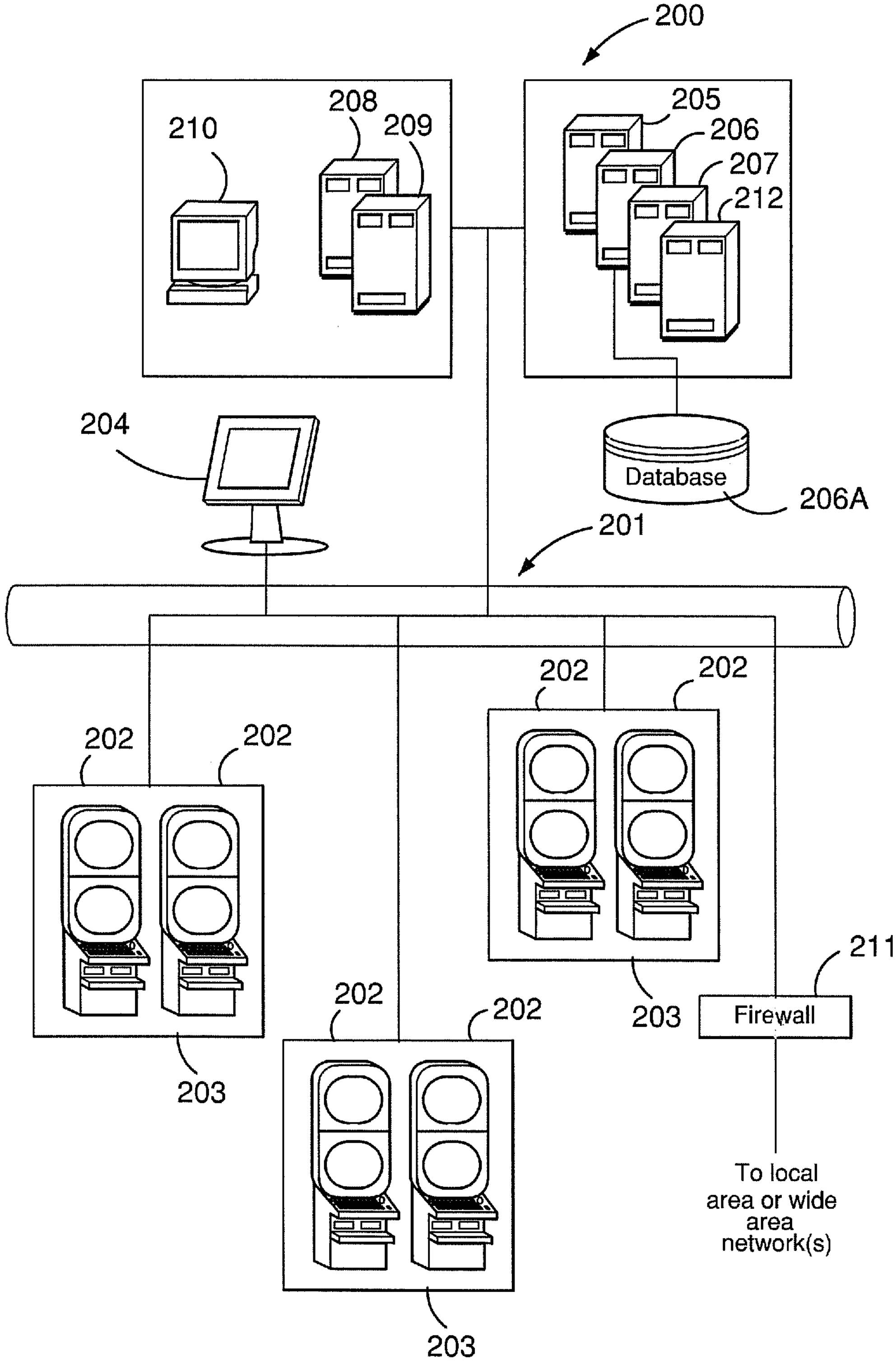
FIG. 5 is a schematic diagram of a gaming system in accordance with an alternative embodiment of the present invention with the gaming system implemented over a network.

FIG. 5 shows a gaming system 200 in accordance with an alternative embodiment. The gaming system 200 includes a network 201, which for example may be an Ethernet network, a LAN or a WAN. In this example, three banks 203 of two gaming machines 202 are connected to the network 201. The gaming machines 202 provide a player operable interface and may be the same as the gaming machines 10,100 shown in FIGS. 2 and 3, or may have simplified functionality depending on the requirements for implementing game play. While banks 203 of two gaming machines are illustrated in FIG. 5, banks of one, three or more gaming machines are also envisaged.

One or more displays 204 may also be connected to the network 201. The displays 204 may, for example, be associated with one or more banks 203 of gaming machines. The displays 204 may be used to display representations associated with game play on the gaming machines 202, and/or used to display other representations, for example promotional or informational material.

In a thick client embodiment, a game server 205 implements part of the game played by a player using a gaming machine 202 and the gaming machine 202 implements part of the game. With this embodiment, as both the game server 205 and the gaming machine 202 implement part of the game, they collectively provide a game controller. A database management server 206 may manage storage of game programs and associated data for downloading or access by the gaming devices 202 in a database 206A. Typically, if the gaming system enables players to participate in a Jackpot game, a Jackpot server 207 will be provided to monitor and carry out the Jackpot game.

In a thin client embodiment, the game server 205 implements most or all of the game played by a player using a gaming machine 202 and the gaming machine 202 essentially provides only the player interface. With this embodiment, the game server 205 provides the game controller. The gaming machine will receive player instructions, and pass the instructions to the game server which will process them and return game play outcomes to the gaming machine. In a thin client embodiment, the gaming machines could comprise computer terminals, e.g. PCs running software that provides a player interface operable using standard computer input and output components and that control the rotation and stopping of the reels.

Servers are also typically provided to assist in the administration of the gaming system 200, including for example a gaming floor management server 208 and a licensing server 209 to monitor the use of licenses relating to particular games. An administrator terminal 210 is provided to allow an administrator to monitor the network 201 and the devices connected to the network.

The gaming system 200 may communicate with other gaming systems, other local networks such as a corporate network, and/or a wide area network such as the Internet, for example through a firewall 211.

A loyalty program server 212 may also be provided.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random number generator engine. Alternatively, a separate random number generator server could be provided.

An example of a specific implementation of the gaming system will now be described in relation to a stand alone gaming machine 40 or 100, although it will be understood that implementation may also be carried out using other gaming system architectures such as a network architecture of the type shown in FIG. 5.

In the present embodiment, the gaming system 10 is arranged to display player symbols using reels with the symbols disposed thereon. In the examples to follow the display area is showing 3 rows and 5 columns of player symbols.

Figure 6:
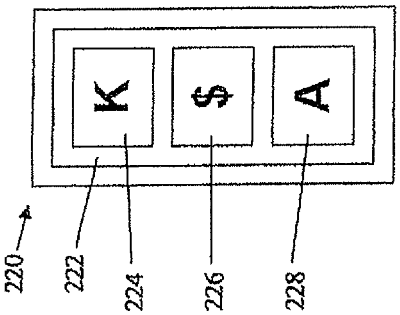
FIGS. 6 to 8 are representations of individual reels displayed by a gaming system in accordance with an embodiment of the present invention.
Figure 7:
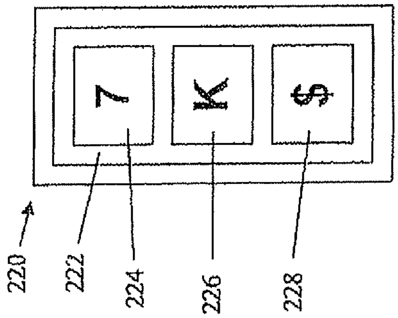
Figure 8:
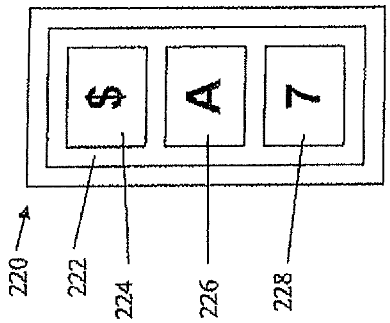

Referring now to FIGS. 6, 7 and 8 there are shown representations of an individual reel 220 as it would appear to the player. The reel 220 comprises a strip of the player symbols 222, only three of which are shown in the display area. Each of the player symbols has a stop with an associated weighted stopping probability and examples are given in Table 1.

TABLE 1

| Stop Number | Symbol | Weight of Stop | Range of weights for this stop |
|---|---|---|---|
| 1 | Star | 4 | 0-3 |
| 2 | King | 4 | 4-7 |
| 3 | Dollar Sign | 3 | 8-10 |
| 4 | Ace | 3 | 11-13 |
| 5 | Seven | 3 | 14-16 |
| 6 | King | 3 | 17-19 |
| 7 | Dollar Sign | 4 | 20-23 |
| 8 | Seven | 4 | 24-27 |
| Total Stops: 8 | Total Symbols: 8 (5 unique) | Total Weight of All Stops: 28 | |

When a game is played, the random number generator selects a random number based on the sum of the weights of each symbol. In this example, the sum of the weights is 28. The random number generator may then be arranged to select a number between 0 and 27, such number corresponding to the range of weights for each stop. For example, if the number 10 is selected by the random number generator, the corresponding stop is number 3 stop. The associated symbol of the stop number 3 is a Dollar Sign. The Dollar Sign symbol will therefore probably be shown in a centre display position 226 with a King symbol being shown at an upper display position 224 and an Ace symbol being shown at a lower display position 228, as shown in FIG. 6.

Rotation and subsequent stopping of the reel is controlled by the rotation controller.

Using the Dollar Sign symbol as a specific example of a player symbol, the probability of it being selected by the random number generator for display in the centre display position 226 is the sum of the weights of each Dollar Sign symbol divided by the total weight of all the stops. In this example, the probability of the Dollar Sign symbol being displayed in the centre display position 226 is therefore 7 out of 28 or 1 in 4.

It would be advantageous if the probability of each individual player symbol being displayed in each of the display positions was equal. This would allow the selection of columns of display positions to be a fair wagering option. Applying this principle to the present example, the probability of the Dollar Sign symbol appearing in either the upper display position 224 or the lower display position 228 would also have to be equal to 1 in 4.

For the Dollar Sign to appear in the lower display position 228, either the King associated with stop position 2 or the King associated with stop position 6 needs to be selected by the random number generator. An example of the King associated with stop position 6 is shown in FIG. 7. In this case, the probability of a King appearing in the centre display position 226 is also 7 in 28, or 1 in 4.

For the Dollar Sign to appear in the upper display position 224, either the Ace associated with stop position 4, as shown in FIG. 8, or the Seven associated with stop position 8 needs to be selected by the random number generator. The chance of either stop position 4 or stop position 8 being selected is 7 in 28, or 1 in 4.

If the probability of the selected player symbol appearing in each of the display positions on each reel is equal, as in the above example, then "line independence" is said to have been achieved. This allows the player to select a display position other than the centre display position 226 and still have the same chance of having the selected player symbol appear in that selected display position. In particular, it allows the player to select one or more columns of display positions, effectively increasing the number of win lines according to the relationship $m^{n*}$ where m is the number of rows (in this case 3) and n* is the number of selected reels or columns.

Figure 9:
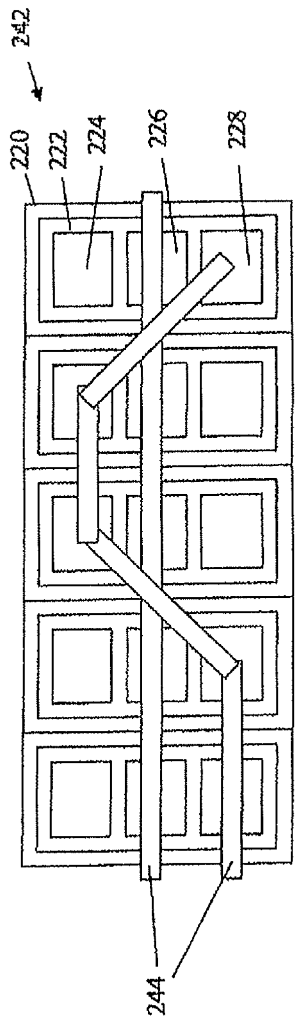
FIGS. 9 to 11 are representations of reels displayed by a gaming system in accordance with an embodiment of the present invention.

An example of two possible win lines 244 is shown in FIG. 9. FIG. 9 shows a display area 242 showing edge portions of five reels 220, each comprising an upper display position 224, a centre display position 226 and a lower display position 228. There are a total of $m^n$ possible win lines 244. In this specific example there are 3 rows and 5 columns of display positions and therefore a total of $3^5$ or 243 possible win lines 244.

Figure 10:
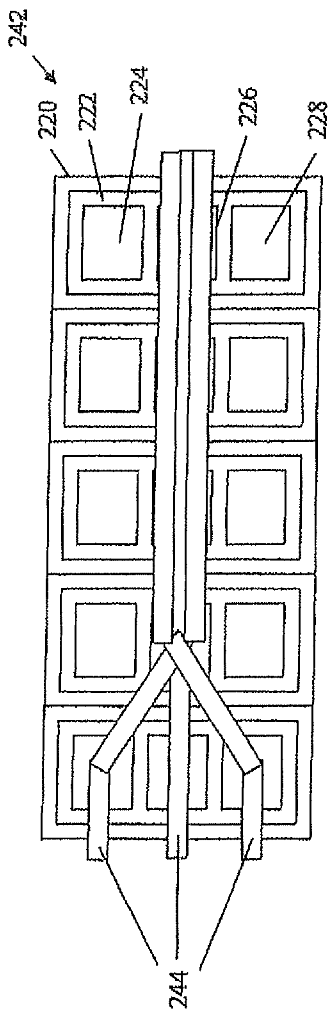
Figure 11:
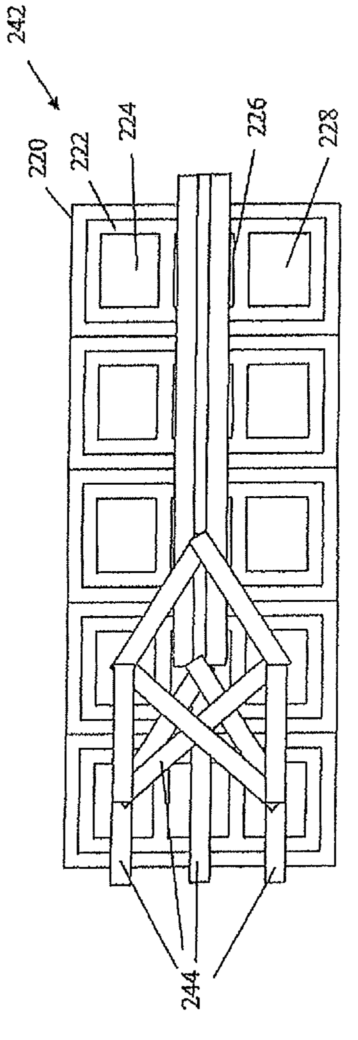

The player may select one or more reels 220, which is equivalent to selecting respective columns of display positions. FIG. 10 illustrates win lines determined by display positions of one selected column. FIG. 11 shows an example illustrating 9 win lines determined by display positions of two selected columns. If 3 reels are selected, 27 win lines 244 are determined, if 4 reels are selected, 81 win lines 244 are determined and if 5 reels are selected, 243 win lines 244 are determined.

Applying usual linear wagering amounts, for example $1 for every 3 win lines wagered, the wager amounts would increase from $1 to $3, $9, $27 and $81 as the number of selected reels is increased from 1 to 2, 3, 4 and 5, respectively. The total payout, however, may not increase in the same manner as the number of win lines is increased and bets are purchased.

In one specific embodiment of the present invention this problem is overcome by increasing awards, such as credit points or payouts associated with each winning combination of player symbols as the number of selected reels is increased. The payouts are increased to maintain the RTN at or above a predetermined level. This may be achieved by implementing a pay table, an example of which is shown in Table 2.

TABLE 2

| Award | Reel 1 Pays | Reels 1-2 Pays | Reels 1-3 Pays | Reels 1-4 Pays | Reels 1-5 Pays |
|---|---|---|---|---|---|
| 77777 | 1,000 | 1,000 | 1,500 | 2,000 | 2,500 |
| 7777 | 250 | 250 | 500 | 750 | 1,000 |
| 777 | 100 | 100 | 200 | 500 | 750 |
| 77 | 25 | 25 | 50 | 75 | 100 |

In this example, the top award is associated with "5 Sevens". If the player selects one reel, the award amount (payout) is $1,000. The payout associated with the same winning combination of player symbols increases to $2,500 if 5 reels are selected.

Figure 12:
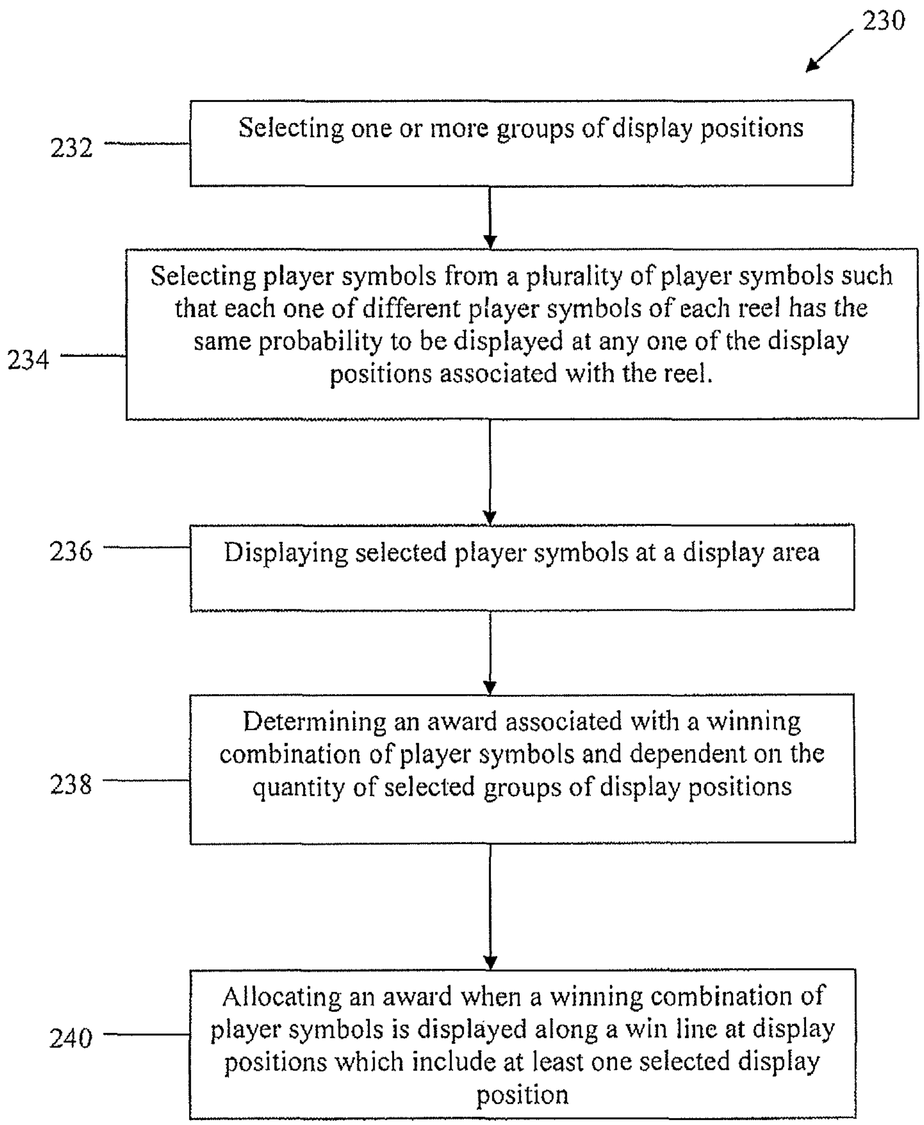
FIG. 12 is a flow diagram illustrating a method of gaming in accordance with an embodiment of the present invention.

FIG. 12 shows a flow chart that illustrates a method 230 of gaming according to a specific embodiment of the present invention. The method includes step 232 of selecting one or more groups of display positions by the player. For example, the groups of display positions 46 may be selected using the buttons 52 of the gaming machine 40 shown in FIG. 2. Each selected display position determines a respective win line. The groups of display positions 46 may be columns of the display positions associated with a respective reel of the gaming machine 40.

Step 234 includes selecting player symbols from a plurality of player symbols, for example by means of the random number generator 24 shown in FIG. 1. The player symbols are selected by rotating the reels about an axis and stopping the reels. Player symbols, positioned at edges of the reels, are then displayed at the display positions 46 of the display area 44 (step 236). As described above with reference to FIGS. 6 to 8, the player symbols are selected so that each player symbol of each reel has the same probability to be displayed at any one of the display positions associated with the reel.

Step 238 includes determining an award associated with a winning combination of player symbols. The award is dependent on the quantity of selected groups of display positions such that an RTP percentage equal to or above a predetermined percentage is maintained.

Step 240 involves allocating an award when a winning combination of player symbols is displayed along a win line at display positions 46.

If a reel is not selected, then one of the display positions in the column of the unselected reel forms a part of the win line. The display position of the unselected column that forms part of the win line may be set to be the centre display position. Alternatively, the player may be given the option of selecting which individual display position of the unselected column will form part of the win line.

It is to be appreciated by a person skilled in the art that the present invention may be embodied in many different forms. For example, the gaming system may be arranged so that the player may select individual display portion or a combination of individual display portions and reels.

The invention claimed is:

1. A gaming system comprising:

a credit input mechanism configured to receive a physical item associated with a monetary value for establishing a credit balance, the credit balance being increasable and decreasable based at least on wagering activity;

a display device having a plurality of groups of display positions;

a plurality of rotatable reels, each rotatable reel comprising a plurality of player symbols, each of the plurality of rotatable reels corresponding to a said group, and arranged so that a plurality of the player symbols are displayed in said groups of display positions when the rotatable reels stop rotating;

a player symbol selector configured to select at least one of the player symbols to be displayed, in accord with having established the credit balance via the credit input mechanism receiving the physical item;

a rotation controller configured to control rotation and stopping of the rotatable reels;

a display position selector configured to receive from a player a selection of one or more of said groups, and in response to one or more of said groups being unselected, separately from the selection of the one or more of said groups, a selection of a display position of each of the unselected one or more of said groups, and to form at least one win line, prior to stopping of the rotatable reels, the win line comprising a) all display positions of the one or more of said groups selected by the player, and b) the selected display position of each of the unselected groups selected by the player; and an award allocator configured to allocate an award when a winning combination of the player symbols is displayed along said at least one win line;

wherein each of the player symbols of each reel has the same probability to be displayed at any one of the display positions associated with the selected one or more groups.

2. The gaming system of claim 1 wherein each reel has a plurality of stops and wherein each stop is associated with a weighted stopping probability.

3. The gaming system of claim 2 wherein each reel has a plurality of stops and wherein each stop is associated with a range of numbers defining the weighted stopping probability, the player symbol selector comprising a random number generator configured to randomly select one of the ranges of numbers and thereby select player symbol for display in the respective groups of display positions.

4. The gaming system of claim 3, wherein a total number of weights is N, and X number of said ranges are consecutive ranges of numbers associated with stops of at least one of the reels, wherein X is the number of stops of the reel and wherein the ranges of the numbers are extended so as to account for a number of duplicate player symbols associated with the reel.

5. The gaming system of claim 1 wherein the at least one win line is one of a number of win lines, and wherein the number of win lines is m multiplied by n* where m is the number of rows of the array and n* is the number of selected groups of display positions.

6. The gaming system of claim 1, wherein said at least one win line comprises a respective sequence of adjacent display positions including one display position of a column and display positions of a row of adjacent rows.

7. The gaming system of claim 1, wherein the at least one win line comprises a respective sequence of adjacent display positions including one display position of a column and display positions of a centre row.

8. The gaming system of claim 1 wherein the groups of display positions are columns of display positions.

9. The gaming system of claim 1, wherein the one or more of said groups of display positions selectable by a player is selected by placing one or more bets.

10. The gaming system of claim 9, wherein the number of bets is proportional to the number of selected one or more groups of display positions.

11. The gaming system of claim 1, wherein the awards associated with winning combinations are larger for a larger number of selected one or more groups of display positions than for a smaller number of selected one or more groups of display positions.

12. The gaming system of claim 1, wherein the award is a function of the quantity of the selected one or more groups of display positions such that a return-to-player percentage (RTP) is above a predetermined return-to-player percentage.

13. A gaming device comprising:

a credit input mechanism configured to receive a physical item associated with a monetary value for establishing a credit balance, the credit balance being increasable and decreasable based at least on wagering activity;

a display device having a plurality of columns and rows;

a plurality of electro-mechanical reels each having a periphery displaying gaming symbols and a stop S associated with each of said symbols, at least one of said electro-mechanical reels being selectable and, in response to one of said electro-mechanical reels being unselected, at least one of said rows of the unselected electro-mechanical reels being selectable by a player;

a player symbol selector configured to, in accord with having established the credit balance via the credit input mechanism receiving the physical item, receive from a player a selection of one or more of said groups, and in response to one or more of said groups being unselected, separately from the selection of the one or more of said groups, a selection of a display position of each of the unselected one or more of said groups, and to form a pay line, prior to stopping of the rotatable reels, the pay line comprising a) all display positions of the one or more of said groups selected by the player, and b) the selected display position of each of the unselected groups selected by the player;

a rotation controller for starting and stopping rotation of each reel, said reels when stopped defining a) a display matrix of n columns and m rows on said display and b) one or more outcomes;

a processor to control the device to stop each reel at a stop S determined by, for each reel having TW number of stop S's, said TW of stops being divided into X number of ranges, assigning to each stop S one of said X number of ranges such that the probability of any symbol appearing in any row m is the same; and a random number generator configured to randomly select a number below TW for each reel, said number falling in an assigned range for a selected stop S, said processor configured to control the device to rotate and stop said reel at the selected stop and determine at least any winning outcomes based on the formed pay line; and a prize allocator configured to, in response to a winning combination of the player symbols being displayed, make any award corresponding to the winning combination of the player symbols.

14. The device of claim 13 comprising a wagering apparatus for the player to wager on at least one symbol arrangement of the outcome, the number possible symbol arrangements being m multiplied by n.

15. The device of claim 14 wherein the wagering apparatus provides for the player to wager on predetermined symbol arrangements.

16. The device of claim 15 wherein the predetermined symbol arrangements include one reel defining a column n and the centre row of remaining columns.

17. The device of claim 13 wherein the processor is configured to determine winning symbol combinations in any wagered arrangement and to issue an award therefore.

18. The device of claim 17 wherein the processor is also be configured to issue an award to the player for any winning arrangement based upon the amount wagered on arrangement with the winning combination, the award for each wager amount having substantially the same return-to-player percentage (RTP).

19. A method of gaming for use with a gaming machine having a credit input mechanism configured to receive a physical item associated with a monetary value for establishing a credit balance, the credit balance being increasable and decreasable based at least on wagering activity, a prize allocator configured to cause a payout associated with the credit balance, a controller and a display device, said display device having a plurality of groups of display positions, the method comprising:

establishing a credit balance via said credit input mechanism receiving the physical item;

in accord with having established the credit balance via the credit input mechanism receiving the physical item, selecting via the controller player symbols from a plurality of player symbols;

rotating via the controller a plurality of reels, each reel being associated with player symbols, the plurality of reels being configured so that selected player symbols are displayed in said plurality of groups of display positions when the reels stop rotating;

stopping via the controller the reels;

receiving via the controller from a player, prior to stopping of the reels, a) a selection of one or more of said groups of display positions, and b) in response to one of said groups of display positions being unselected, a selection of a display position of each of the unselected one or more of said groups separately from the selection of the one or more of said groups;

forming at least one win line from all display positions of the selected one or more groups selected by the player and the selected display position of each of the unselected groups selected by the player; and allocating via the prize allocator an award when a winning combination of the player symbols is displayed along said at least one win line;

wherein said selecting includes selecting the player symbols so that each one of different player symbols of each reel has the same probability to be displayed at any one of the display positions associated with the reel.

20. The method of claim 19 wherein each reel has a plurality of stops and wherein each stop is associated with a weighted stopping probability.

21. The method of claim 20 wherein each reel comprises a plurality of stops and wherein each stop of each reel is associated with a range of numbers defining a weighted stopping probability, the step of selecting player symbols comprising selecting random numbers of the ranges of numbers.

22. The method of claim 21 wherein a total number of weights is N X number of said ranges are consecutive ranges of numbers with which stops of each reel are associated, wherein X is the number of stops of each reel and wherein the ranges of the numbers are extended so as to account for a number of duplicate player symbols that each reel comprises.

23. The method of claim 19 wherein the method is conducted so that, if one or more groups of display positions are unselected, one display position of the at least one unselected group of display positions forms a part of said at least one win line.

24. The method of claim 19 wherein the award is determined so that the award that is associated with each winning combination is larger for a larger number of selected groups of display positions than for a smaller number of selected groups of display positions.

25. The method of claim 19, wherein the award associated with each winning combination is determined so that, as a function of the quantity of the selected groups of display positions, the return-to-player percentage is above a predetermined return-to-player percentage.

26. The method of gaming of claim 19 wherein said display positions are arranged in an array of columns and rows, and wherein said groups of display positions are formed by said columns; and wherein said step of receiving includes receiving from a player a said selection of groups that provides at least two unselected said groups of display positions, and wherein said step of receiving includes receiving from a player the selection of at least two display positions of the unselected groups from each of two different rows of said array.

* * * * *